United States Patent [19]

Howald et al.

[11] Patent Number: 5,973,027
[45] Date of Patent: Oct. 26, 1999

[54] INK FOR USE IN INK JET PRINTERS

[75] Inventors: Nicole Howald, Jona; Peter Drescher, Tann/ZH, both of Switzerland

[73] Assignee: Pelikan Produktions AG, Egg/ZH, Switzerland

[21] Appl. No.: 09/099,634

[22] Filed: Jun. 18, 1998

[30] Foreign Application Priority Data

Jun. 19, 1997 [DE] Germany .......................... 197 26 043

[51] Int. Cl.⁶ .......................... C08F 26/10; C08F 10/14; C08F 210/14; C08F 226/10; C09D 11/02
[52] U.S. Cl. ..................... 523/160; 106/31.6; 106/31.65; 106/31.78; 526/264; 526/348.2; 526/348.3; 526/38.4; 526/348.5
[58] Field of Search ..................... 523/160, 161; 106/31.13, 31.6, 31.65, 31.78; 526/264, 348.2, 348.3, 348.4, 348.5, 348.8

[56] References Cited

U.S. PATENT DOCUMENTS

| | | | |
|---|---|---|---|
| 3,423,381 | 1/1969 | Clark et al. | 526/211 |
| 4,190,718 | 2/1980 | Lorenz et al. | 526/207 |
| 4,241,048 | 12/1980 | Durbak et al. | 424/45 |
| 4,604,139 | 8/1986 | Shioi et al. | 106/31.58 |
| 5,171,807 | 12/1992 | Kopolow | 526/264 |
| 5,538,548 | 7/1996 | Yamazaki | 524/386 |
| 5,837,046 | 11/1998 | Schofield et al. | 106/31.86 |

FOREIGN PATENT DOCUMENTS

| | | |
|---|---|---|
| 3234772 | 1/1991 | Japan . |
| 5202329 | 8/1993 | Japan . |
| 9059554 | 3/1997 | Japan . |
| 1209791 | 10/1970 | United Kingdom . |
| WO 96/24642 | 8/1996 | WIPO . |
| WO 96/17409 | 5/1997 | WIPO . |

*Primary Examiner*—Vasu Jagannathan
*Assistant Examiner*—Callie E. Shosho
*Attorney, Agent, or Firm*—Fay, Sharpe, Beall, Fagan, Minnich & McKee, LLP

[57] ABSTRACT

Described is an ink for use in ink jet printers, comprising (a) a solvent, which consists at least of approximately 80% of a homopolar, non-watery solvent, (b) a pigment dispersed in the solvent and (c) a copolymer of vinyl-pyrrolidone with one or several long-chain α-olefins with at least 6 carbon atoms, specifically with 6 to 24 carbon atoms. Properties of the ink are as follows: reduced color bleeding, reduced penetration of coloring agent into the surface of the paper, improved optical density and improved storage stability.

12 Claims, No Drawings

INK FOR USE IN INK JET PRINTERS

The present invention relates to an ink for use in ink jet printers.

There is increased propagation with respect to ink jet printing, specifically with respect to so-called "desk top publishing," which is specifically attributable to its capability of providing multi-color printouts by application of three or more primary inks onto a substrate in one single pass.

Other printing methods require, as a rule, a separate pass through the printer for each primary color. An important benefit of the ink jet printer is also their favorable price.

Thermal ink jet printing systems play a particularly important role. These have an ink reservoir with liquid-conducting connection to a print head, on which are located a plurality of resistors. The selective activation of the resistors causes a thermal excitation of the ink and its outward propulsion. Exemplary thermal ink jet printing systems are described in U.S. Pat. Nos. 5,500,895 and 4,794,409.

Other systems are based on the so-called piezo technology, wherein a piezo element is excited by an electric impulse, whereby a drop of ink is expelled.

The inks intended for use in ink jet printers must satisfy a number of criteria. For example, during a pause in printing, they must not undergo any change which might result in clogging of the ink spray jets. In order to prevent such clogging of jets, use is frequently made of pigmented inks on the basis of aliphatic hydrocarbons having a high boiling point. Such inks have the following benefits in comparison with inks on water basis or on basis of polar organic solvents: The ink quickly migrates into porous substrates, such as paper, cardboard, etc. During any printing pauses, it does not dry up in the area of the jet and, thus, results in high reliability. The prints are completely water resistant, even on porous substrates. The metal components inside the print head are not subject to corrosion, since the ink has no electrical conductivity. Frequently, polyamine fatty acid condensation polymers serve as dispergators for the pigments contained in the ink. Such ink is disclosed, for example, in WO 96/24642.

The known inks do, however, have a series of drawbacks. The chemicals employed as dispergators may result in irritation of eyes, skin and mucous membranes. In addition, these inks have the tendency of being sucked into the interior of the substrate due to capillary forces which stem, for example, from the customarily employed paper substrates. Thus, a major part of the ink pigment is no longer available at the surface of the substrate, which results in insufficient optical density when imprinting porous substrates.

Another problem occurs in the preparation of multi-colored images by ink jet print if an ink of one color is applied onto or in the immediate vicinity next to an ink of a different color. This problem shows itself in an intermixing or running into each other of the inks at their border regions, as a result of which the border line between the inks becomes blurred. To experts in the area of print technology, this phenomenon is known under the term "color bleeding."

Lastly, the known inks on the basis of homopolar hydrocarbons show insufficient dispersion stability, which results in inhomogeneities or in formation of sediments during longer storage periods.

The invention is, therefore, based on the object of making available an ink for use in ink jet printers, which does not have the indicated drawbacks, or only to a reduced degree, and which has, specifically, reduced color-bleeding property, reduced penetration of coloring agent into the paper surface, improved optical density and improved storage stability.

According to the invention, this object is solved by an ink which comprises the components (a) to (c):
a) a solvent, which consists of at least approximately 80% of a homopolar, non-watery solvent,
b) a pigment dispersed in the solvent, and
c) a copolymer of vinyl-pyrrolidone with one of several long-chain α-olefins with at least 6 carbon atoms, specifically with 6 to 24 carbon atoms.

The ink according to the invention contains a copolymer of vinyl-pyrrolidone with one or several long-chain α-olefins with at least 6 carbon atoms. Preferred is the range from 6 to 24 carbon atoms, specifically 12 to 20 carbon atoms. Copolymers of this type are also called alkylated vinyl-pyrrolidone polymers or alkylated PVP. They are obtained via copolymerization of vinyl-pyrrolidone and long-chain α-olefins. Aside from the formation of linear copolymers of the heterocyclic monomer and the long-chain α-olefins, an insertion occurs of long-chain alkyl rests into the vinyl-pyrrolidone structure.

The copolymers may be described by the following general formula:

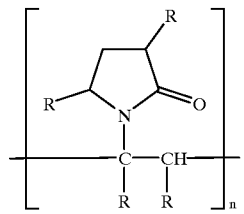

(I)

wherein R stands for H or a long-chain alkyl rest.

By means of variation of the molecular weight of the alkyl groups and the weight ratio of α-olefin to vinyl-pyrrolidone, one obtains a plurality of polymers with different properties. The copolymers are non-poisonous and toxicologically harmless.

Preferred copolymers are obtained by copolymerization of vinyl-pyrrolidone with α-olefins having 12 to 20 carbon atoms. Specifically preferred as long-chain α-olefins are hexadecene or eicosene. Preferred copolymers have an average molecular weight (determined by high-velocity membrane osmometer) of approximately 5,000 to 12,000, specifically approximately 7,000 to 10,000. Furthermore, it is preferred that the copolymer has a melt range of below room temperature to approximately 100° C., specifically of below room temperature to approximately 40° C. The copolymer is preferably largely dissolved in the solvent.

The preferred copolymers are fully soluble in aliphatic hydrocarbons, such as n-pentane, n-heptane or methyl cylohexane, but insoluble in polar solvents, such as water, n-propanol, ethanol or methanol.

The pigment employed int he ink according to the invention may be any pigment which is normally used in ink jet printing inks. Preferred pigments are those which are identified as organic pigments in "The Color Index." Following application on the substrate, the pigment should be water-insoluble in order to avoid smudging upon contact with water-containing substances. A particularly preferred black pigment is carbon black.

The particle size of the dispersed pigment ranges preferably between approximately 5 and 500 nm, specifically between approximately 5 and 300 nm. It is, moreover, preferred that the specific weight of the pigment be close to that of the selected solvent, since this results in further improvement of the ink with respect to formation of sediment.

The employable amount of pigment largely depends upon its type, in general it ranges from approximately 2 to 20% by weight relative to the ink and specifically between 4 and 15% by weight.

The ink according to the invention contains, in addition, a solvent, which consists of at least 80%, specifically of at least approximately 95% and particularly preferred of basically 100% of a homopolar non-watery solvent. The solvent preferably contains at least approximately 80%, specifically at least approximately 95% of one or several aliphatic hydrocarbons (or essentially consists thereof). A suitable mixture of aliphatic hydrocarbons is, for example, a distillate from fractionation of natural or synthetic hydrocarbon mixtures, which is, for example, marketed under the trade name EXXSOL by Exxon Chemical GbmH, Cologne.

The homopolar, non-watery solvent preferably has a boiling point of above approximately 100° C., preferably above approximately 200° C., and specifically within a range of 230 to 325° C. The solvent may contain smaller amounts of polar solvents, such as esters, ethers, amides or alcohols in order to dissolve, for example, the pigment according to the general formula (I) or other ink components. It is, however, preferred that the polar solvents do not exceed an amount of approximately 5% by weight, in proportion to the ink.

The amount of copolymer which is to be added depends first and foremost upon the type and amount of the employed pigment. The added amount of copolymer must suffice in order to singley or in combination with another dispersion agent adequately stabilize the employed pigment in the solvent and to furthermore satisfactorily realize the aspired objectives according to the invention. The quantity required for said purpose can easily be ascertained by the expert by means of simple tests.

As a general quantitative frame of reference, the following may be specified: approximately 5 to 25% by weight in proportion to the total amount of homopolar, non-watery solvent, dispersed pigment and copolymer of vinyl-pyrrolidone with long-chain α-olefin, specifically approximately 20% by weight. A particularly suitable general requisite is an ink according to the invention, which is characterized in that it contains, in proportion to the total amount of homopolar, non-watery solvent, dispersed pigment and the copolymer of vinyl-pyrrolidone and the long-chain α-olefin, approximately 60 to 90% by weight of homopolar, non-watery solvent, approximately 5 to 25% by weight of copolymer and approximately 2 to 15% by weight of dispersed pigment.

The ink according to the invention may contain, in addition to the components (a) to (c), additional standard ink additives. Such additives may serve, for example, for control of the wetting behavior of the ink. Additionally standard additives, which may be added to the ink according to the invention, are, for example, auxiliary dispersing agents, surface-active substances (wetting agents), resins and waxes. The additives can also exert a certain influence upon the viscosity. The viscosity of ink according to the invention is approximately 1 to 50 cSt.

The beneficial properties of the ink according to the invention are presumably based on the following relationships: with respect to the copolymer to be added according to the invention, we are dealing with an amphiphile polymer, which has a polar structural unit and a homopolar alkyl rest. The copolymer is soluble in the homopolar, non-watery solvent and acts as a dispergator for the pigment which is insoluble in the solvent. The dispergator envelops the pigment, so that a "physical" solution is formed. In the homopolar, non-watery, preferably aliphatic solvent, the alkyl rest is capable of freely developing and expanding, to a large degree, and to bring about improved stabilization. The copolymer, which has deposited itself on the surface of the pigment particles leads to an increase in the apparent particle size of the pigment particles. As a result, the pigment particles when meeting the substrate are held firm at the surface of same. This effect results in higher optical density with identical pigment concentration. This effect limits the deliquescence of the drop of ink, which leads to great edge sharpness and a reduction in color-bleeding.

The invention will now be explained using the following examples: The following general methods were employed for characterization of the inks according to the invention and for the comparison inks.

In order to determine the stability, the inks according to the invention and/or the comparison inks were measured by means of a dynometer (sedimentation scale) from BYK Labotron. This instrument permits, over a given time period, the weighing of sinking particles in a fluid. The measuring of force takes place by means of an inductive force transducer. The force is converted into an electrical quantity. With respect to measuring technique, the weight of the sinking particles, which are collected on a plate, is captured and recorded as a function of time. For that purpose, the plate of the scale is connected to the force transducer, the sample is thoroughly stirred, the plate lowered and the sample immersed. Subsequently, a zero balance is taken and the increase in weight of the settling sediment is registered with a TY recording instrument as a function of time. The measured values are specified as increase in force in mN over a 72-hour time period.

Measuring of pigment particle sizes was done on an Autosizer 4700 according to the photo-correlation-spectroscopy method (PCS).

EXAMPLE 1

An ink according to the invention was prepared in accordance with the following recipe. It contains EXXSOL D-140, a mixture of aliphatic hydrocarbons from Exxon with a boiling point of 287° C.; Antaron V-216 is a PVP/hexadecene-copolymer from GAF Chemical, Switzerland; Elftex 495 is a carbon black pigment from the Cabot Corporation:

| | |
|---|---|
| EXXSOL D-140 | 82.2% by weight |
| Antaron V-216 | 10.2% by weight |
| Elftex 495 | 7.6% by weight |

EXAMPLE 2 (Comparison Example)

A comparison ink was prepared according to the following recipe (in accordance with Example 1 of WO 96/24642):

| | |
|---|---|
| EXXSOL D-140 | 65.5% by weight |
| Oleyl alcohol | 20% by weight |
| Polyester-amine-dispersant, 40% solution in aliphatic hydrocarbon (SOLSPERSE 13940) | 3.75% by weight |
| Substituted ammonium phthalocyanine sulfonate (SOLSPERSE 5000) | 0.2% by weight |
| Regal Black (carbon black pigment) | 11% by weight |

EXAMPLE 3

The ink according to the invention and the comparison ink were subjected to the earlier described sedimentation test.

The results are summarized in the Table below:

TABLE I

| Increase in Force by sedimented particles over 72 hours | |
|---|---|
| Example 1 | 0.036 mN |
| Example 2 | 0.066 mN |

The results show that the comparison ink has less stability.

EXAMPLE 4

Different printing specimens were prepared with a test printer on butterfly paper, using the ink according to the invention and/or the comparison ink. The printing specimens were optically evaluated under a light microscope. The results are summarized in Table II.

TABLE II

| | Example 1 | Example 2 |
|---|---|---|
| Dissolution | + | o |
| Outline Sharpness | + | − |

+ = good
o = moderate
− = inadequate

Having thus described the preferred embodiment, the invention is now claimed to be:

1. Ink for employment in ink jet printers, comprising
   (a) at least 80% of a homopolar, non-watery solvent,
   (b) a pigment, dispersed in the solvent, and
   (c) a copolymer of vinyl-pyrrolidone with at least one long-chain α-olefins having at least 6 carbon atoms.

2. Ink according to claim 1, characterized in that the long-chain α-olefin has 12 to 20 carbon atoms.

3. Ink according to claim 1, characterized in that the long-chain α-olefin is hexadecene or eicosene.

4. Ink according to claim 1, characterized in that the copolymer has a melting range from below room temperature to approximately 100° C.

5. Ink according to claim 1, characterized in that the copolymer has an average molecular weight of approximately 500 to 12,000.

6. Ink according to claim 1, characterized in that the average particle size of the dispersed pigment lies between 5 and 500 nm.

7. Ink according to claim 1, characterized in that the homopolar, non-watery solvent is an aliphatic hydrocarbon or a mixture of aliphatic hydrocarbons.

8. Ink according to claim 7, characterized in that the aliphatic hydrocarbon is selected from the group consisting of alicyclic hydrocarbons, cycloaliphatic hydrocarbons and mixtures thereof.

9. Ink according to claim 1, characterized in that the ink has a kinematic viscosity of approximately 1 to 50 cSt.

10. Ink according to claim 1, characterized in that the pigment is carbon black.

11. The ink according to claim 1, characterized in that the long-chain α-olefin has 6 to 24 carbon atoms.

12. Ink for employment in ink Jet printers comprising relative to the total amount of homopolar, non-watery solvent, copolymer and dispersed pigment, approximately 60 to 90% by weight of homopolar, non-watery solvent, approximately 5 to 25% by weight of copolymer and approximately 2 to 15% by weight of dispersed pigment.

* * * * *